United States Patent [19]

Diamond

[11] Patent Number: 4,699,336
[45] Date of Patent: Oct. 13, 1987

[54] AIRPLANE SAFETY BODY PASSENGER COMPARTMENT

[76] Inventor: Peter Diamond, P.O. Box A, Tunkhannock, Pa. 18657

[21] Appl. No.: 860,903

[22] Filed: May 8, 1986

[51] Int. Cl.$^4$ ................................................ B64C 1/32
[52] U.S. Cl. ................................................ 244/140
[58] Field of Search ........................ 244/139, 140, 141

[56] References Cited

U.S. PATENT DOCUMENTS

| 1,760,061 | 5/1930 | Horni | 244/140 |
|---|---|---|---|
| 1,895,256 | 1/1933 | Love | 244/140 |
| 2,066,810 | 1/1937 | Van Meter, Jr. | 244/140 |
| 2,077,910 | 4/1937 | Thomson | 244/140 |
| 4,298,177 | 11/1981 | Berlongieri | 244/139 |

FOREIGN PATENT DOCUMENTS 580446  9/1946  United Kingdom .

Primary Examiner—Joseph F. Peters, Jr.
Assistant Examiner—Rodney Corl
Attorney, Agent, or Firm—Richard L. Miller

[57] ABSTRACT

An airplane safely body passenger compartment is provided which contains a mechanism for ejecting the passenger compartment from an elongated receptacle in the fuselage when an airplane is in danger of crashing so that parachutes will gently float the passenger compartment to the earth.

7 Claims, 9 Drawing Figures

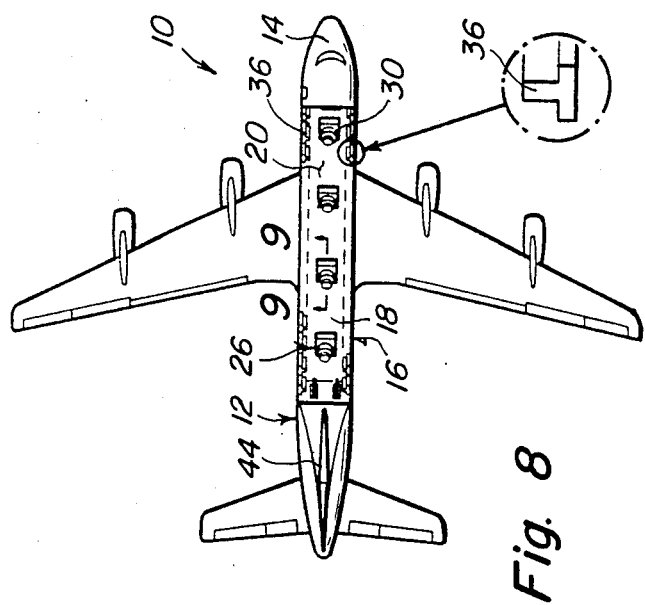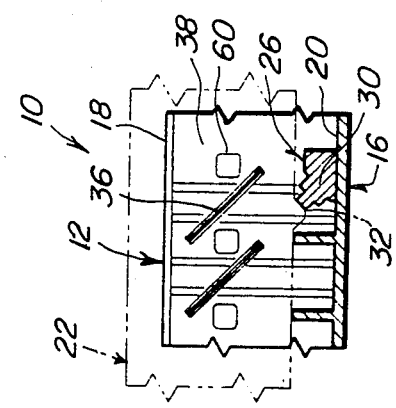
Fig. 8
Fig. 9

AIRPLANE SAFETY BODY PASSENGER COMPARTMENT

BACKGROUND OF THE INVENTION

The instant invention relates generally to aircraft and more specifically it relates to an airplane safety body passenger compartment.

Numerous aircraft have been provided in prior art that are adapted to include detachable cabin sections with parachutes for soft landings. For example, U.S. Pat. Nos. 2,120,477; 3,508,727 and 3,881,671 all are illustrative of such prior art. While these inventions may be suitable for the particular purpose to which they address, they would not be as suitable for the purposes of the present invention as heretofore described.

SUMMARY OF THE INVENTION

The airplane safety body passenger compartment is airtight, watertight, completely self contained with air, food, restrooms etc. The compartment is on rails and is ejected upward by a series of lifting cylinders which remain in the fuselage of the crashing air plane. The compartment is so constructed that the pilot can leave his cockpit, enter the passenger compartment, close an air tight door and activate a release mechanism. The parachutes and lifting cylinders work in unison for ejection. The whole compartment can be transferred from one airplane that is in for engine or fuselage repair to another that is ready for service. In this way one passenger compartment can service two airplanes. Beneath the compartment are two air bags that are inflated at ejection. The parachutes, lifting cylinders and air bags are all designed to do the proper job.

A primary object of the present invention is to provide an airplane safety body passenger compartment that will overcome the shortcomings of the prior art devices.

Another object is to provide an airplane safety body passenger compartment that will separate from the rest of an airplane and float to the earth with parachutes for passengers peace of mind, being another safety factor, will reduce the insurance needed and most of all save lives.

An additional object is to provide an airplane safety body passenger compartment that contains air bags beneath the compartment which will cushion the shock of landing even in a close ground crash so as to absorb a great deal of the shock to prevent injury to the passengers.

A further object is to provide an airplane safety body passenger compartment that is simple and easy to use.

A still further object is to provide an airplane safety body passenger compartment that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 8 is a top view of an airplane incorporating the invention.

FIG. 9 is an enlarged cross sectional view taken an line 9—9 in FIG. 8 illustrating further structural details.

DETAILED DESCRIPTION OF THE PREFERRED EMBODIMENTS

Figure 1:
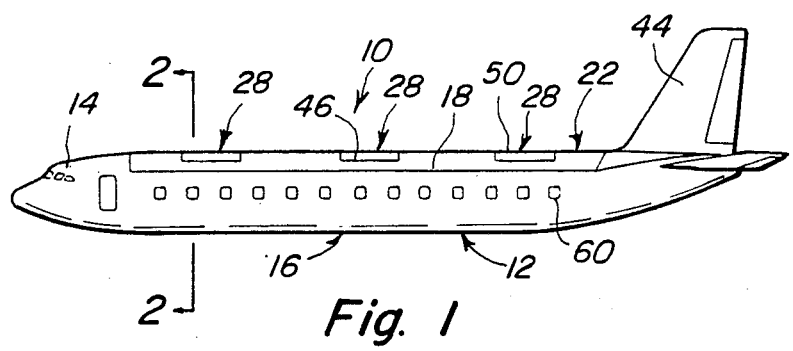
FIG. 1 is a side view of an airplane with the invention installed therein.
Figure 2:
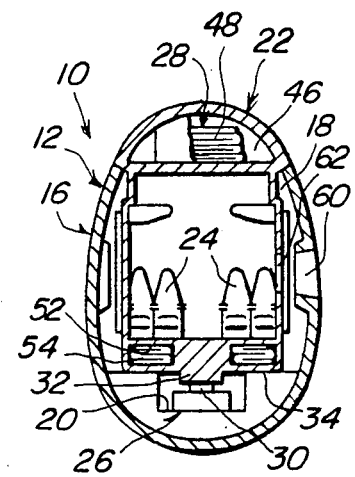
FIG. 2 is an enlarged cross sectional view taken along line 2—2 in FIG. 1.
Figure 3:
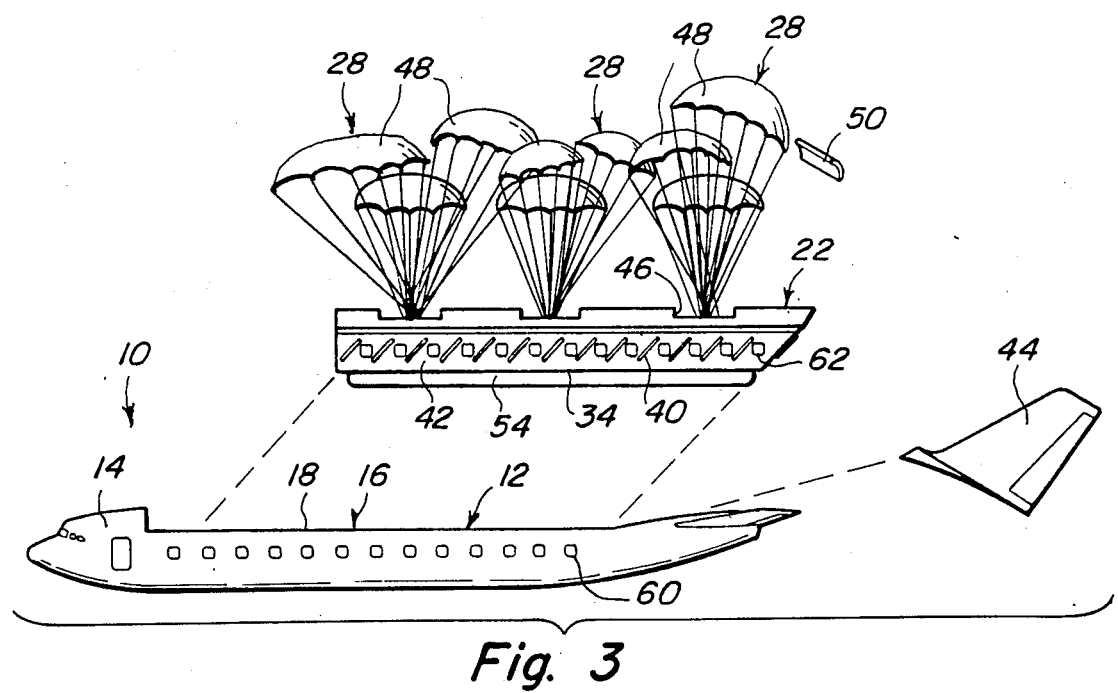
FIG. 3 is a side view of the airplane illustrating the passenger compartment separated from same, and descending on cluster parachutes.
Figures 4, 5, 6:
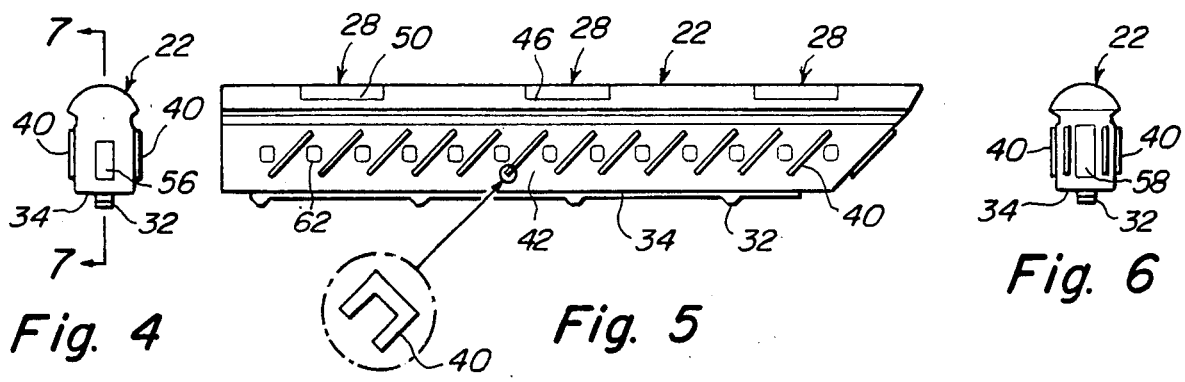
FIG. 4 is a front end view of the passenger compartment.
FIG. 5 is a side view thereof showing a detail of one of the tracks.
FIG. 6 is rear end view thereof.
Figure 7:
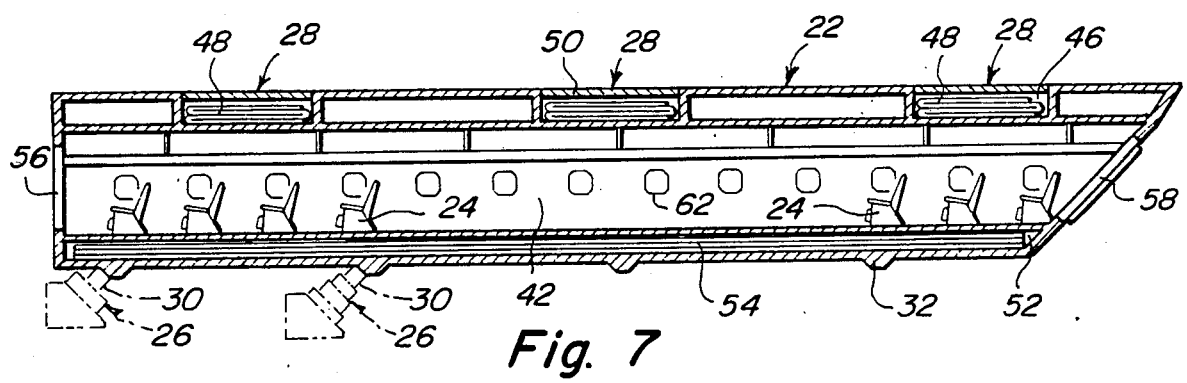
FIG. 7 is an enlarged cross sectional view taken along line 7—7 in FIG. 4 in which one of the deflated air bags is shown.

Turning now descriptively to the drawings, in which similar reference characters denote similar elements throughout the several views, FIGS. 1 through 9 illustrate an airplane 10 that consists of a main section 12 which includes a cockpit 14 and a fuselage 16 that has an elongated receptacle 18 and a floor 20 therein. A detachable air tight passenger compartment 22 is provided and has a plurality of seats 24 for passengers (not shown). The airplane 10 also contains a device 26 for ejecting the passenger compartment 22 from the receptacle 18 of the fuselage 16 of the main section 12 of the airplane 10 that is in danger of crashing. A container device 28 is for gently floating the passenger compartment 22 to the earth.

The ejecting device 26 consists of a plurality of lifting cylinders 30 spaced apart and mounted to the floor 20 of the receptacle 18 of the fuselage 16 of the main section 12. A plurality of lifting blocks 32 are spaced apart and formed to underside 34 of the passenger compartment 22 to rest upon the lifting cylinders 30. When the lifting cylinders 30 are activated the lifting blocks 32 will be pushed away from the floor 20 allowing wind to further push the passenger compartment 22 away from the airplane 10.

The airplane 10 further contains a plurality of tracks 36 spaced apart and rearwardly angled to sides 38 of the receptacle 18 in the fuselage 16. A plurality of rails 40 are spaced apart and rearwardly angled to sides 42 of the passenger compartment 22. The rails 40 ride in the tracks 36 so that when the passenger compartment is ejected from the receptacle 18 of the fuselage 16 the passenger compartment will travel upwardly and rearwardly away from the airplane 10. The airplane 10 also has a blow away tail 44 so that the tail 44 will be free from the fuselage 16 when the passenger compartment 22 is ejected therefrom.

The container device 28 includes the passenger compartment 22 having a plurality of spaced apart top chambers 46 formed therein. A plurality of parachutes 48 are attached within the top chambers 46 of the passenger compartment. A plurality of covers 50 are each removably attached to each of the top chambers 46 to hold the parachutes 48 within the chambers until released.

The passenger compartment 22 has two bottom chambers 52 formed therein. Two elongated air bags 54 are each attached within each of the chambers 52. When the passenger compartment is ejected from the receptacle 18 of the fuselage 16 the air bags 54 will be inflated to cushion the shock of landing even in a close ground crash so as to absorb a great deal of the shock and prevent injury to the passengers within the passenger compartment.

The passenger compartment further contains a front air tight entrance door 56 so that a pilot and crew of the airplane 10 can leave the cockpit 14 after throttling down the speed of the airplane from crusing speed to just above the stalling speed. In the time it takes for the airplane to slow down the crew will enter the passenger compartment through the front door 56 and activate a release mechanism (not shown) to operate the lifting cylinders 30 for ejecting the passenger compartment 22 and jettisoning the parachute covers 50 and the tail 44 simultaneously. A rear airtight exit door 58 is also provided so that the pilot, crew and the passengers can exit therefrom when the passenger compartment is safely on the earth.

A plurality of first window 60 are spaced apart between the tracks 36 in the sides 38 of the receptacle 18 in the fuselage 16. A plurality of second windows 62 are spaced apart between the rails 40 in the sides 42 of the passenger compartment 22. The second windows 62 will align with the first windows 60 when the passenger compartment is in place within the receptacle of the fuselage. This allows the passengers in the seats 24 to look out of the airplane 10 during normal operations of the airplane.

The purpose of the lifting cylinders 30 is to push the airplane safety body passenger compartment 22 up with great force while at the same time the clusters of forty five ton capacity parachutes 48 are pulling upward. When the upward movement begins the airplane 10 moving forward creates an air lifting motion by having air moving at one hundred and sixty miles per hour (stalling speed) 90 into the space left by the passenger compartment 22, which will also have a lifting motion. With all these forces working simultaneously the lifting of the passenger compartment 22 should perform as planned.

The lifting cylinders 30 are tubes of alloy aluminum material. Each tube is ten feet in length making the extended cylinder 30 forty feet long.

The lifting cylinder is made up of four tubes with each tube having a wall thickness of one inch. The base tube is three feet outside diameter. The second tube is two feet and eleven inches O.D. The third tube is two feet and ten inches O.D. The forth tube is two feet and nine inches O.D. Total weight of all the lifting cylinders 30 is approximately nine point nine tons. They will contain five hundred pounds of air per square inch. This with all other factors working it's estimated to lift one hundred tons, forty feet high in approximately ten seconds.

The parachutes 48 are forty five ton capacity cluster chutes of three to a cluster. Each cluster will weigh about eight hundred pounds and can be contained in a space in one chamber 46 eight feet by eight feet by three feet high. The rate of descent at approximately twenty eight to thirty five feet per second should not injure the passengers due to the air bags 54 that will take up the shock of landing.

The passenger compartment 22 is a completely separate unit, is transferable and can be moved from one airplane to another simply by being lifted out. While one airplane is down for engine repair work etc. the passenger compartment can be placed into another airplane that is ready for service. The passenger compartment can also be dropped as a supply depot, workshop or for other uses.

While certain novel features of this invention have been shown and described and are pointed out in the annexed claims, it will be understood that various omissions, substitutions and changes in the forms and details of the device illustrated and in its operation can be made by those skilled in the art without department from the spirit of the invention.

What is claimed is:

1. An airplane comprising:
   (a) a main section including a cockpit and a fuselage having an elongated receptacle with a floor therein,
   (b) a detachable air tight passenger compartment having a plurality of seats for passengers,
   (c) means for upwardly ejecting said passenger compartment from said receptacle of said fuselage of said main section when said airplane is in danger of crashing;
   (d) means for gently floating said passenger compartment to earth;
   (e) a plurality of tracks spaced apart and rearwardly angled to sides of said receptacle in said fuselage; and
   (f) a plurality of rails spaced apart and rearwardly angled to sides of said passenger compartment, said rails ride in said tracks so that when said passenger compartment is upwardly ejected from said receptacle of said fuselage said passenger compartment will travel upwardly and rearwardly away from said airplane whereby the continued forward movement of the main section creates an air lifting motion on the passenger compartment.

2. An airplane as recited in claim 1 wherein said ejecting means comprises:
   (a) a plurality of lifting cylinders spaced apart and mounted to said floor of said receptacle of said fuselage of said main section; and
   (b) a plurality of lifting blocks spaced apart and formed to underside of said passenger compartment to rest upon said lifting cylinders so that when said lifting cylinders are activated said lifting blocks will be pushed away from said floor allowing wind to further push the passenger compartment away from the airplane.

3. An airplane as recited in claim 1 further comprising a blow away tail so that said tail will be free from said fuselage when said passenger compartment is ejected therefrom.

4. An airplane as recited in claim 3 wherein said floating means comprises:
   (a) said pasenger compartment having a plurality of spaced apart top chambers formed therein;
   (b) a plurality of parachutes attached within said top chambers of said passenger compartment; and
   (c) a plurality of covers each removably attached to each of said top chambers to hold said parachutes within said chambers until released.

5. An airplane as recited in claim 4 further comprising:
(a) said passenger compartment having at least one bottom chamber formed therein; and
(b) at least one elongated air bag attached within said at least one bottom chamber so that when said passenger compartment is ejected from said receptacle of said fuselage said at least one air bag will be inflated to cushion shock of landing even in a close ground crash whereby a great deal of the shock will be absorbed so as to prevent injury to passengers within said passenger compartment.

6. An airplane as recited in claim 5 wherein said passenger compartment further comprises:
(a) a front air tight entrance door so that pilot and crew of said airplane can leave said cockpit after throttling down speed of said airplane from cruising speed to just above stalling speed whereby in time it takes for said airplane to slow down said crew will enter said passenger comparment through said front door and activate a release mechanism to operate said lifting cylinders for ejecting said passenger compartment and jettison said parachute covers and said tail simultaneously; and
(b) a rear airtight exit door so that said pilot, crew and said passengers can exit therefrom when said passenger compartment is safely on said earth.

7. An airplane as recited in claim 6 further comprising:
(a) a plurality of first windows spaced apart between said tracks in said sides of said receptacle in said fuselage; and
(b) a plurality of second windows spaced apart between said rails in said sides of said passenger compartment so that said second windows will align with said first windows when said passenger compartment is placed within said receptacle of said fuselage allowing said passengers in said seats to look out of said airplane during normal operations of said airplane.

* * * * *